(12) United States Patent
Yamaguchi (10) Patent No.: US 7,248,859 B2
(45) Date of Patent: Jul. 24, 2007

(54) MOBILE COMMUNICATION SYSTEM, MOBILE COMMUNICATION METHOD AND MOBILE COMMUNICATION PROGRAM

(75) Inventor: Kazuyuki Yamaguchi, Tokyo (JP)

(73) Assignee: NEC Corporation, Tokyo (JP)

( * ) Notice: Subject to any disclaimer, the term of this patent is extended or adjusted under 35 U.S.C. 154(b) by 69 days.

(21) Appl. No.: 10/974,952

(22) Filed: Oct. 28, 2004

(65) Prior Publication Data

US 2005/0085229 A1   Apr. 21, 2005

Related U.S. Application Data

(63) Continuation of application No. 09/823,012, filed on Mar. 30, 2001, now Pat. No. 6,871,065.

(30) Foreign Application Priority Data

Mar. 31, 2000   (JP) ............... 2000-096337

(51) Int. Cl.
H04M 3/42 (2006.01)
(52) U.S. Cl. ............... 455/414.1; 455/422.1; 455/433; 455/435.1
(58) Field of Classification Search ............ 455/414.1, 455/414.2, 414.3, 422.1, 412.1, 3.01–3.06, 455/403, 404.2, 412.2, 432.1, 432.3, 435.1
See application file for complete search history.

(56) References Cited

U.S. PATENT DOCUMENTS 5,457,680 A    10/1995 Kamm et al.
5,884,169 A    3/1999 Uchiyama et al.
5,896,558 A    4/1999 Wiedeman
6,549,773 B1   4/2003 Linden et al.

FOREIGN PATENT DOCUMENTS

| EP | 0 973 3000 | 1/2000 |
|---|---|---|
| JP | 11-201769 | 7/1999 |
| JP | 11-234748 | 8/1999 |
| JP | 2000-36978 | 2/2000 |
| WO | WO-00/41414 | 7/2000 |
| WO | WO-00/59252 | 10/2000 |

OTHER PUBLICATIONS

Siemens—WAP Architecture, Mar. 27, 2000, (see the whole document), Siemens.com.

(Continued)

*Primary Examiner*—Fan Tsang
*Assistant Examiner*—Simon Sing
(74) *Attorney, Agent, or Firm*—Dickstein, Shapiro, LLP.

(57) ABSTRACT

To receive content services from a content server accepted in an Internet via a GW (GateWay) unit by a mobile user terminal connected to a mobile communication network, a plurality of GW units are located in respective predetermined areas. A part of radio communication base stations to be the mobile communication network connects an access request to the content server accepted in the Internet with a predetermined GW unit. When the mobile user terminal moves from a first area to a second area, roaming service is executed among the radio communication base stations in the mobile communication network, the mobile user terminal is connected to a second GW unit, an inquiry is issued to another GW unit, roaming service is executed among GW units, and thereby content services are continued for the moving mobile user terminal.

6 Claims, 6 Drawing Sheets

OTHER PUBLICATIONS

Wireless Application Protocol, Mar. 2000, (see the whole document), http://www.tml.hut.fi/Opinnot/Tik-111.550/1999/Esitemat/Wap/wap/WAP.html.

Japanese Office Action issued Nov. 26, 2002 (w/English translation of relevant portion).

"Wireless Application Protocol Architecture Specification" WAP Architecture Version (Apr. 30, 1998) pp. 1-20.

MOBILE COMMUNICATION SYSTEM, MOBILE COMMUNICATION METHOD AND MOBILE COMMUNICATION PROGRAM

CROSS-REFERENCE TO RELATED APPLICATIONS

This is a continuation of U.S. patent application Ser. No. 09/823,012, filed Mar. 30, 2001, now U.S. Pat. No. 6,871,065 in the name of Kazuyuki YAMAGUCHI, and entitled MOBILE COMMUNICATION SYSTEM, MOBILE COMMUNICATION PROGRAM AND MOBILE COMMUNICATION PROGRAM.

BACKGROUND OF THE INVENTION

1. Field of the Invention

The present invention relates to a mobile communication system for providing contents to a mobile communication terminal, and more particularly to the mobile communication system suitable to provide contents to the mobile communication terminal which moves in a wide area, and a mobile communication method and a mobile communication program used in the mobile communication system.

The present application claims priority of Japanese Patent Application No. 2000-096337 filed on Mar. 31, 2000, which is hereby incorporated by reference.

2. Description of Related Art

As an integration technique, a packaging technique, a communication technique and a like advance, it is possible for a mobile user terminal as a mobile communication terminal having a radio communication function, such as a cellular telephone to access various servers in the Internet in which computer networks are connected one another. As a result, a user of the mobile user terminal can not only transmit and receive an electronic mail but also browse information such as characters and images of content data obtained from various servers using a display section of the mobile user terminal.

Figure 7:
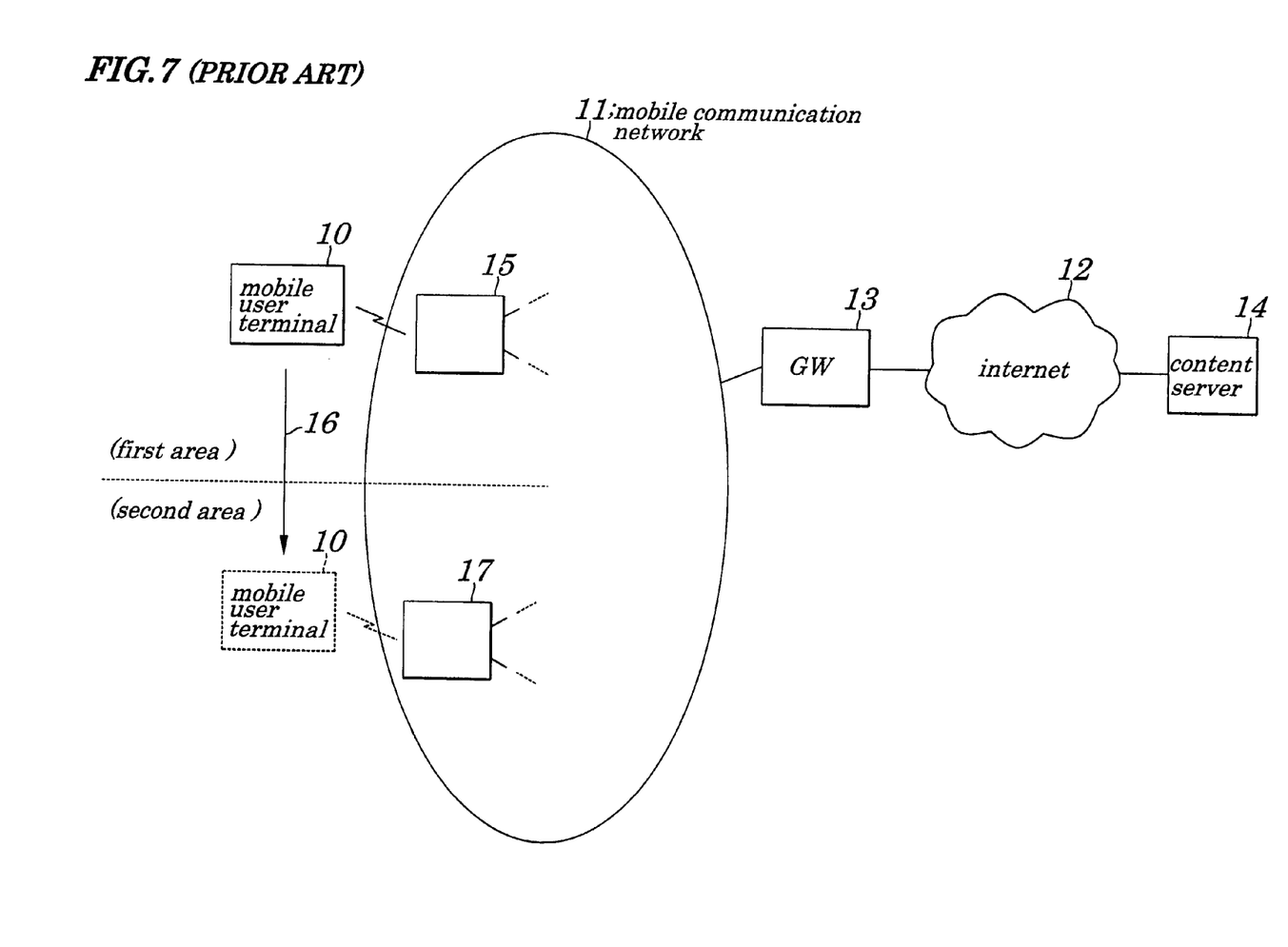
FIG. 7 is a diagram showing a configuration of a conventional mobile communication system.

FIG. 7 is a diagram showing a configuration of a mobile communication system for browsing contents in the Internet using a mobile user terminal 10. When the mobile user terminal 10 is a cellular telephone, the mobile user terminal (cellular telephone) 10 is connected to a GW (Gate Way) unit 13 via a mobile communication network 11 which is a cellular telephone network. The GW unit 13 is connected to an Internet 12. The Internet 12 accepts a plurality of content servers 14 storing content data of various data formats such as characters and images, and it is possible to identify the content servers 14 with addresses which are individually given to the content servers 14.

In this mobile communication system, an access request from the mobile user terminal 10 to the content server 14 is transmitted to the GW unit 13 via the mobile communication network 11. With the mobile user terminal 10, the access request is given so as to designate an address for identifying the content server 14 in the Internet 12. The GW unit 13 executes a protocol conversion and a like between the mobile communication network 11 and the Internet 12 and transmits the access request to the content server 14 via the Internet 12. The content server 14 takes designated content data from various previously stored content data in accordance with the received access request and transmits the designated content data to the GW unit 13 via the Internet 12. The GW unit 13 executes the protocol conversion and a like and transmits the designated content data via the mobile communication network 11 to the mobile user terminal 10 which requires to obtain content data. The mobile user terminal 10, for example, displays the content data including image data on a display screen in accordance with a data format of the received content data.

Now, concerning the mobile communication network 11 in the conventional mobile communication system shown in FIG. 7, generally, a mobile communication service area includes a plurality of small areas, a radio communication base station 15 is located in each small area, and thereby a wide service area such as a cellular telephone network is carried out. When the mobile user terminal 10 moves from the radio communication base station 15 area to an adjacent area, the mobile user terminal 10 keeps a communication connection with another terminal by roaming service between the radio communication base stations 15 without disconnection. Generally, the "roaming service" is a meaning that a mobile user terminal 10 communicates in an area of a common carrier with which no contract is made, however, hereafter, the roaming service includes that information necessary for communication is received and transmitted regardless of a contract.

When the mobile user terminal 10 issues an access request to the content server 14, the mobile user terminal 10 exists in an area of the radio communication base station 15 which manages a first area in the mobile communication network 11. Then, when it is assumed that the mobile user terminal 10 moves from the first area to a second area by movement 16, the mobile user terminal 10 is connected to a radio communication base station 17 which manages the second area in the mobile communication network 11 by the execution of the roaming service. At this time, roaming information as communication information necessary for communication with the content server 14 is transferred from the radio communication base station 15 managing the first area to the radio communication base station 17 managing the second area. Therefore, it is possible for the mobile user terminal 10 to keep the communication connection with the content server 14 via the GW unit 13 by the execution of the roaming service.

As described above, in the conventional communication system, though the roaming service between radio communication base stations 15, 17 in the mobile communication network 11 is executed, connection of the GW unit 13 is kept in a case in that the mobile user terminal 10 receives content services from the content server 14. Therefore, though the mobile user terminal 10 moves geographically between two places at a long distance, a service is executed via the GW unit 13 first accessed.

However, a moving time is shorten by advances of locomotion, a case increases in that content services are provided while connecting with the mobile communication network 11 having a very wide area. In this case, when the mobile user terminal 10 connects with the GW unit 13 first accessed, a long distance communication is executed by the roaming service in the mobile communication network 11. When a network becomes large and a number of mobile user terminals 10 increases, a frequency of long distance communications for connection with the GW unit 13 in the mobile communication network 11 increases. Therefore, there are problems in that a throughput of the mobile communication network 11 deteriorates and a communication cost of the mobile user terminal 10 increases.

Also, though a plurality of GW units 13 are provided by increment of content service users, in a case that the mobile user terminal 10 moves and connects with a GW unit 13 which is firstly accessed, there are problems in that use efficiency of the GW unit 13 lowers and it is impossible to provide stable services.

SUMMARY OF THE INVENTION

In view of the above, it is an object of the present invention to provide a mobile communication system capable of providing content services to a user service effectively and to provide and a mobile communication method and a mobile communication program used in the mobile communication system.

According to a first aspect of the present invention, there is provided a mobile communication system including:

a content server for providing content data requested via a network;

a mobile communication terminal for issuing a request to provide the content data via a mobile communication network; and a plurality of gateway units located respectively in predetermined areas, for executing protocol conversion of the request and the content data transmitted between the network and the mobile communication network and for continuously providing the content data from the content server to the mobile communication terminal by transmitting and receiving communication information to provide the content data.

In the foregoing, a preferable mode is one wherein each of the plurality of gateway units includes a service management information storing section for storing service management information including at least identification information of the content data so as to correspond to identification information of the mobile communication terminal to which the content data is provided via each of the plurality of gateway units, an inquiry section, when the request is received from the mobile communication terminal, for inquiring of each of other gateway units whether the identification information of the mobile communication terminal is registered in the service management information storing section using the identification information as a search key, a search section for searching said service management information in response to an inquiry from said inquiry section of an arbitrary one of other gateway units, a communication information transmitting section, when the identification information of the mobile communication terminal is searched by the search section, for transmitting communication information used to provide the content data to the identification information of the mobile communication terminal to the gateway unit which has issued the inquiry, a content request section for requesting the content server to provide the content data corresponding to the request based on the communication information transmitted by the communication information transmitting section of each of said other gateway units in accordance with the inquiry from the inquiry section and a content transferring section for transferring the content data from the content server, the content data requested by the content request section to the mobile communication terminal.

According to a second aspect of the present invention, there is provided a mobile communication system including:

a mobile communication terminal for issuing a request to provide the content data via a mobile communication network;

a plurality of gateway units, each of gateway units located respectively in predetermined areas and including a protocol conversion section for executing protocol conversion of the request and the content data transmitted between a predetermined network and the mobile communication network, a request relay section for relaying the request and a terminal providing section for providing the content data to the mobile communication terminal in accordance with the request relayed by the request relay section; and a content server for providing the content data to a gateway unit issuing the request relayed by the request relay section via the predetermined network.

In the foregoing, a preferable mode is one wherein the mobile communication network includes a plurality of radio communication base stations, each of the radio communication base stations which cover an area smaller than each of the predetermined areas and communicate one another, and at least one of the plurality of radio communication base stations transmits the request to a predetermined gateway unit among the plurality of gateway units.

the mobile communication network includes a plurality of radio communication base stations, each of the radio communication base stations which cover an area smaller than each of the predetermined areas and communicate one another, and at least one of the plurality of radio communication base stations transmits the request to a predetermined gateway unit among the plurality of gateway units.

Also, a preferable mode is one wherein the request is transmitted to a gateway unit geographically nearest to the mobile communication terminal.

Furthermore, a preferable mode is one wherein the mobile communication terminal is a cellular telephone and the identification information of the mobile communication terminal is a telephone number.

According to a third aspect of the present invention, there is provided a mobile communication method in a mobile communication system including a content server for providing content data requested via a network; a mobile communication terminal for issuing a request to provide the content data via a mobile communication network; and a plurality of gateway units located respectively in predetermined areas, for executing protocol conversion of the request and the content data transmitted between the network and the mobile communication network and for continuously providing the content data from the content server to the mobile communication terminal by transmitting and receiving communication information to provide the content data, the mobile communication method including:

a service management information storing step of storing service management information including identification information of the content data so as to correspond to identification information of the mobile communication terminal to which the content data is provided via each of the plurality of gateway units, the service management information is registered in a service management information storing section;

an inquiry step, when the request is received from the mobile communication terminal, of inquiring of each of other gateway units whether the identification information of the mobile communication terminal is registered in the service management information storing section using the identification information as a search key;

a search step of searching service management information of the each of the plurality of gateway units in response to an inquiry from an arbitrary one of other gateway units;

a communication information transmitting step, when the identification information of the mobile communication terminal is searched by the search step, of transmitting communication information used to provide content data to the identification information of the mobile communication terminal to the gateway unit issuing the inquiry;

a content request step of requesting the content server to provide the content data corresponding to the request based on the communication information transmitted by the communication information transmitting step in each of said other gateway units in accordance with the inquiry section; and a content transferring step of transferring the content data from the content server to the mobile communication terminal.

According to a fourth aspect of the present invention, there is provided a mobile communication program used in a mobile communication system including a content server for providing content data requested via a network; a mobile communication terminal for issuing a request to provide the content data via a mobile communication network; and a plurality of gateway units located respectively in predetermined areas, for executing protocol conversion of the request and the content data transmitted between the network and the mobile communication network and for continuously providing the content data from the content server to the mobile communication terminal by transmitting and receiving communication information to provide the content data, the mobile communication program including:

a service management information storing step of storing service management information including identification information of the content data so as to correspond to identification information of the mobile communication terminal to which the content data is provided via each of the plurality of gateway units, the service management information is registered in a service management information storing section;

an inquiry step, when the request is received from the mobile communication terminal, of inquiring of each of other gateway units whether the identification information of the mobile communication terminal is registered in the service management information storing section using the identification information as a search key;

a search step of searching service management information of the each of the plurality of gateway units in response to an inquiry from an arbitrary one of other gateway units;

a communication information transmitting step, when the identification information of the mobile communication terminal is searched by the search step, of transmitting communication information used to provide content data to the identification information of the mobile communication terminal to the gateway unit issuing the inquiry;

a content request step of requesting the content server to provide the content data corresponding to the request based on the communication information transmitted by the communication information transmitting step in each of the other gateway units in accordance with the inquiry section; and a content transferring step of transferring the content data from the content server to the mobile communication terminal.

With the above configurations, in the mobile communication system for providing the content data to the mobile communication terminal from the content server via the network, each gateway unit is located in each predetermined area. Each gateway unit executes protocol conversion of the request so as to provide content data from the mobile communication terminal and the content data from the content server, which are transmitted between the network and the mobile communication network, and continues to provide the content data to the mobile communication terminal by receiving and transmitting communication information for providing content data to each other.

Also, the gateway unit stores the service management information in which identification information of the content data is stored so as to be corresponded to identification information of the mobile communication terminal to which the content data is provided via the gateway unit. Then, when the request of the content data is received from the mobile communication terminal, each of other gateway units is inquired about whether the identification information of the mobile communication terminal is registered or not using the identification information of the mobile communication terminal as a search key. When the identification information of the mobile communication terminal is inquired from the other GW unit, its service management information is searched using identification information of an inquired mobile communication terminal as a search key. When a desired mobile communication terminal is registered, communication information for providing content data to the identification information of the mobile communication terminal is transmitted to the gateway unit which has issued the inquiry. The gateway unit requested by the mobile communication terminal relays communication information necessary to provide content data from the other gateway unit, requests the content server to provide the content data corresponding to the request to the content server based on the communication information and provides the requested content data to the mobile communication terminal.

Also, in a mobile communication system for providing content data to a mobile communication terminal by a content server via a network, each of gateway units is located in each predetermined areas. The gateway unit executes protocol conversion of the request and the content data transmitted between a network and the communication network, and the request of content data and the corresponding content data are relayed. The content server receives the content data request relayed by each gateway unit and provides content data to the gateway unit issuing the request via the network.

Also, concerning at least a radio communication base station among the plurality of radio communication base stations to be mobile communication network, the request of the content data is transmitted to one of predetermined gateway units. With this operation, though the mobile communication terminal moves between two places at a very long distance, it is possible to provide a service quality and billing efficiently.

Also, the request is transmitted to a gateway unit geographically nearest to the mobile communication terminal.

Also, it is possible to provide content services such as a cellular telephone system and a WAP (Wireless Application Protocol) system using existing mobile communication terminals generally used and it is possible to provide services efficiently.

Also, though the mobile communication terminal moves two places at a very long distance, it is unnecessary to receive content services while the mobile communication terminal connects with a gateway unit which is firstly accessed, and therefore, it is possible to improve system efficiency and to provide stable services.

Also, since service management information is stored in each gateway unit, an inquiry process can be simplified about an existence of roaming information as communication information necessary for content services provided to each mobile communication terminal among gateway units.

Also, it is unnecessary to provide a communication line necessary for transmitting and receiving the roaming information among gateway units, and it is possible to reduce infrastructure costs.

Also, though the mobile communication terminal moves two places at a very long distance, it is possible to improve system efficiency and to provide stable services. Particularly, it is possible to reduce communication costs when the mobile communication terminal moves two places while communicating.

Furthermore, it is possible to use existing mobile communication terminals which are generally used, the mobile communication terminals capable of providing content services such as a cellular telephone system and a WAP (Wireless Application Protocol) system and it is possible to provide services efficiently.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes for carrying out the present invention will be described in further detail using an embodiment with reference to the accompanying drawings.

Figure 1:
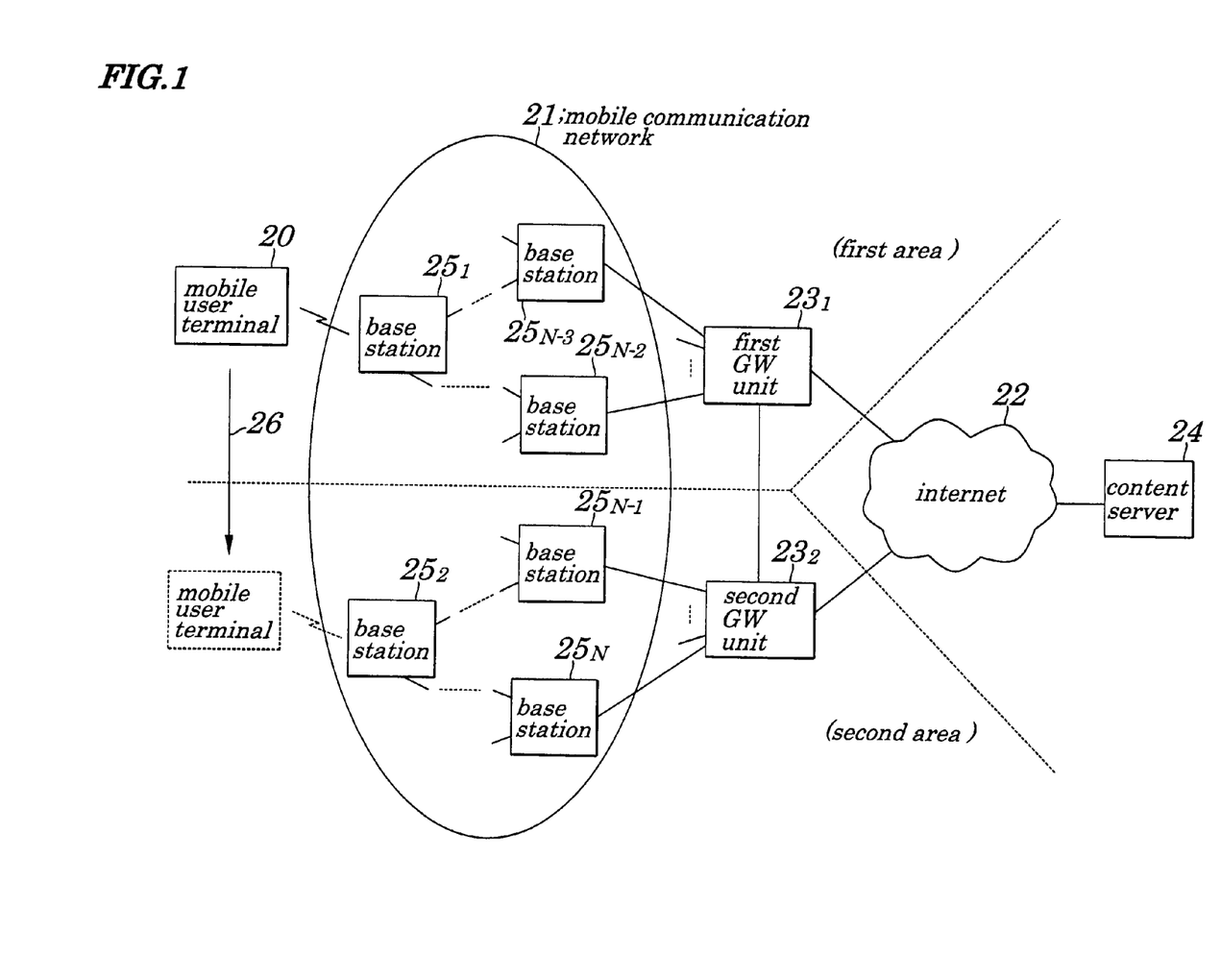
FIG. 1 is a diagram showing a configuration of a mobile communication system according to an embodiment of the present invention.

FIG. 1 is a diagram showing a configuration of a mobile communication system according to an embodiment of the present invention. In the mobile communication system, a mobile user terminal 20 having a radio communication function as a mobile communication client is connected to an Internet 22 via a mobile communication network 21. For example, a cellular telephone is used as the mobile user terminal 20 and a cellular telephone network is used as the mobile communication network 21. The mobile communication network 21 is connected with GW (GateWay) units located in respective areas which are previously divided, and a communication connection is executed between the mobile communication network 21 and the Internet 22 via these GW units. In the mobile communication system of the embodiment, it is assumed that a first GW unit $23_1$ is located in a first area (shown in FIG. 1) and a second GW unit $23_2$ is located in a second area (shown in FIG. 1).

The Internet 22 accepts a plurality of content servers for storing content data of various data formats such as characters and images, and each of the content servers can be identified by each address which is peculiarly given to each content server. In the embodiment, the Internet 22 is connected with a content server 24 as one of these content servers.

The mobile communication network 21 is provided with a plurality of radio communication base stations $25_1$, $25_2$, . . . , $25_{N-3}$, $25_{N-2}$, $25_{N-1}$, $25_N$. Each of the radio communication base station $25_1$ to radio communication base station $25_N$ manages communication of the mobile user terminal 20 in an area smaller than the first area or the second area, and thereby it is possible to cover a wide mobile communication service area of the mobile communication network 21. Also, when the mobile user terminal 20 moves, roaming service is executed from one of the radio communication base station $25_1$ to radio communication base station $25_N$ to another, and thereby it is possible to maintain mobile communication of the mobile user terminal 20.

A group of the radio communication base station $25_1$ to radio communication base station $25_N$ in the mobile communication network 21 transmits an access request to various content servers accepted in the Internet 22 to a predetermined GW unit. In this embodiment, among the radio communication base station $25_1$ to radio communication base station $25_N$ in the mobile communication network 21, the radio communication base station $25_{N-3}$ and the radio communication base station $25_N$ transmit an access request to the content server 24 accepted in the Internet 22 via the first GW unit $23_1$ and the radio communication base station $25_{N-1}$ and the radio communication base station $25_N$ transmit an access request to the content server 24 accepted in the Internet 22 via the second GW unit $23_2$.

The first GW unit $23_1$ and the second GW unit $23_2$ execute a protocol conversion and a like between the mobile communication network 21 and the Internet 22, and are connected to each other via a wireless or wired communication line. Also, the first GW unit $23_1$ and the second GW unit $23_2$ manage the mobile user terminal 20 which receives content services from the content server 24 of the Internet 22 via the first GW unit $23_1$ and the second GW unit $23_2$.

In the mobile communication system of this embodiment, when the mobile user terminal 20 existing in the first area gives an access request to the content server 24 accepted in the Internet 22, the mobile user terminal 20 is connected to the Internet 22 via the radio communication base station $25_{N-3}$ and the first GW unit $23_1$. Then, in a communication connection state for providing content services from the content server 24, roaming service is executed among the radio communication base station $25_1$ to radio communication base station $25_N$ as the mobile user terminal 20 moves to the second area (a movement 26).

A part of the radio communication base stations $25_1$ to $25_N$ which execute the roaming service transmit the access request message 70 to the content server 24 accepted in the Internet 22 to a predetermined GW unit $23_1$, $23_2$. Therefore, the mobile user terminal 20 is connected to the second GW unit $23_2$ via the radio communication base station $25_N$ in accordance with the movement 26.

When the second GW unit $23_2$ judges that access request received from the mobile user terminal 20 is an access request that no content service is received by the second GW unit $23_2$, the second GW unit $23_2$ inquires to another GW unit previously set as an inquiry destination about an existence of information necessary to keep content services which are already provided. Then, when roaming information as information necessary to keep already provided content services is obtained from the GW unit which responds, it is kept to provide content services from the content server 24 that is an access request destination via the second GW unit $23_2$ using the roaming information.

With this configuration, the mobile user terminal 20, which receives the content services from the content server 24 accented in the Internet 22 via the first GW unit $23_1$ located in the first area, can continuously receive the content services from the content server 24 via the second GW unit $23_2$ located in the second area in response to the movement 26.

Now, a main part of the mobile communication system capable of carrying out roaming service among GW units will be explained.

Each of the GW units $23_1$, $23_2$ in this embodiment holds service providing management information to carry out roaming service from one to another.

Figure 2:
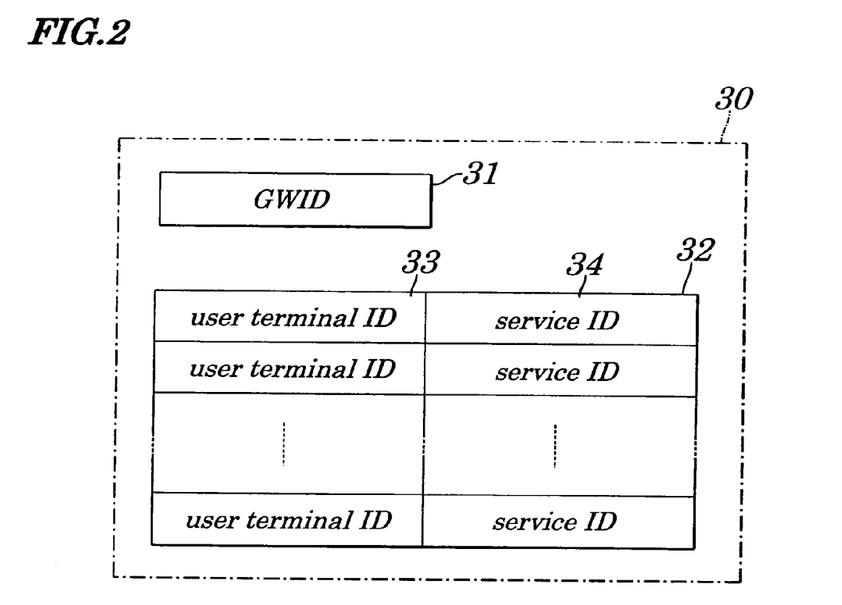
FIG. 2 is an explanatory view showing service providing management information held by a gateway unit according to the embodiment of the present invention.

FIG. 2 shows service providing management information held by the GW unit in this embodiment.

Service providing management information 30 includes a GWID (GateWay IDentifier) 31 for identifying each GW unit $23_1$, $23_2$ and service management information 32. The service management information 32 includes user terminal ID (IDentifier) 33 for identifying the mobile user terminal 20 which receives the content services from the content server 24 via the GW unit $23_1$, $23_2$ and service ID (IDentifier) 34 for identifying the content services provided from the content server 24 to the mobile user terminal 20 identified by the user terminal ID 33, so that the user terminal ID 33 corresponds to the service ID 34.

The GWID 31 is previously given to each GW unit. Each GW unit generates the service management information 32 and previously holds content service information in which content services provided by each content server are set.

Figure 3:
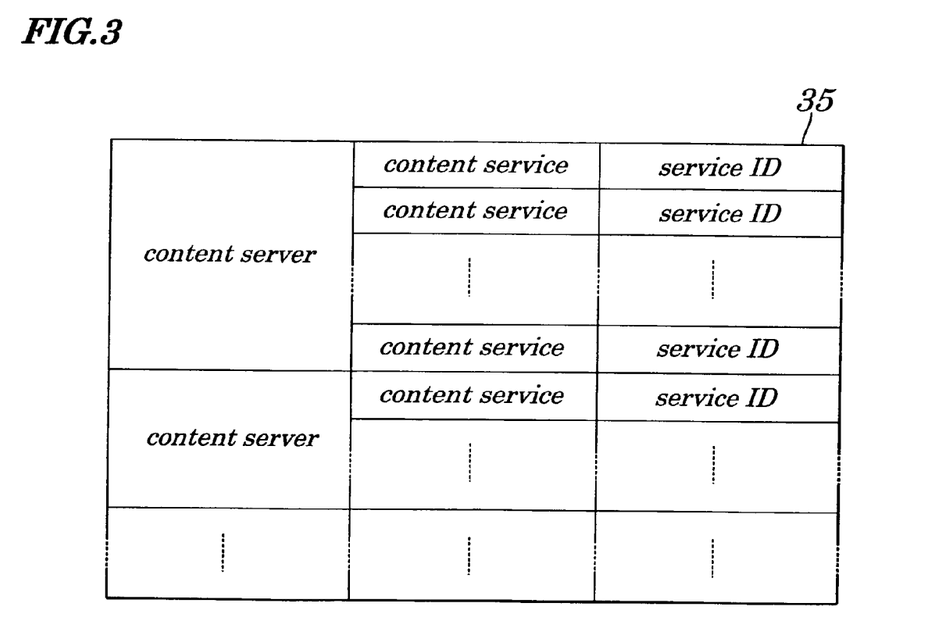
FIG. 3 is an explanatory view showing content service information held by the gateway unit according to the embodiment of the present invention.

FIG. 3 shows the content service information held by the GW unit $23_1$, $23_2$ in this embodiment.

In content service information 35, service IDs (IDentifiers) 34 previously determined so as to be corresponded to kinds of services provided by each content server 24 are stored for each content server 24 accepted in the Internet 22.

When there is an access request from the mobile user terminal 20 to the content server 24, for example, in a case the mobile user terminal 20 is a cellular telephone, each GW unit $23_1$, $23_2$ sets a telephone number of the cellular telephone as the user terminal ID 33, selects a service ID corresponding to a service of the access request while referring to the content service information 35 and generates the service management information 32. Also, the service management information 32 of the mobile user terminal 20 for which a predetermined communication finishing process is executed is deleted suitably.

Each GW unit $23_1$, $23_2$ holding the service providing management information 30, when there is an access request from the mobile user terminal 20 to the content server 24 accepted in the Internet 22 via the mobile communication network 21, searches the service management information 32. When service management information 32 of a same service required by the mobile user terminal 20 is already registered in accordance with the user terminal ID 33 of the mobile user terminal 20, the GW unit $23_1$, $23_2$ executes the access request to the content server 24 via the Internet 22. On the other hand, as a result of researching the service management information 32, when the mobile user terminal 20 which issues the access request is not registered, the GW unit $23_1$, $23_2$ inquires to another GW unit $23_1$, $23_2$ of an existence of information necessary to keep the already provided content services using the GWID 31 and the user terminal ID 33. When the user terminal ID 33 added to this inquiry is registered in the service management information 32 managed by another GW unit $23_1$, $23_2$, corresponding service management information 32 is returned together with the roaming information necessary for maintaining to provide the content services. Then, the content services are continuously provided to the mobile user terminal 20 issuing the access request using the received service management information 32 and the received roaming information.

Therefore, each of the first GW unit $23_1$ and the second GW unit $23_2$ is provided with a CPU (Central Processing Unit) not shown and executes above-described control in accordance with control programs stored in a storage unit such as a ROM (Read Only Memory).

Figure 4:
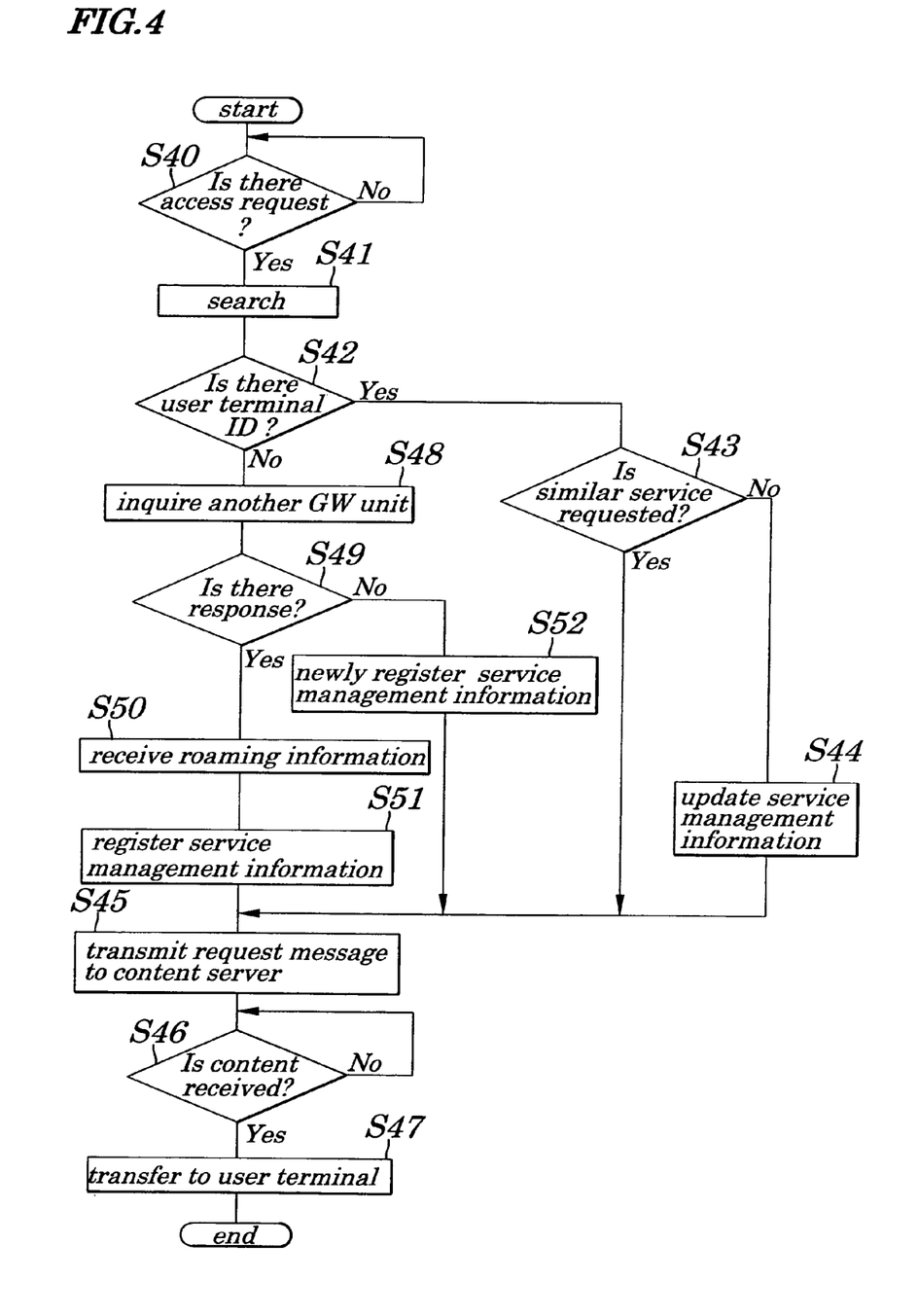
FIG. 4 is a flowchart showing an inquiry process for carrying out roaming service with the gateway unit according to the embodiment of the present invention.

FIG. 4 is a flowchart showing an inquiry process for carrying out roaming service in each GW unit $23_1$, $23_2$.

First, each GW unit $23_1$, $23_2$ monitors an access request from a mobile user terminal 20 to a content server 24 accepted in the Internet 22 via the mobile communication network 21 (Step S40: N). When the access request is detected (Step S40: Y), the service management information 32 (shown in FIG. 2) held by each GW unit $23_1$, $23_2$ is searched using the user terminal ID 33 such as the telephone number previously given to the mobile user terminal 20 issuing the access request (Step S41).

As a searched result, when the user terminal ID 33 of the mobile user terminal 20 issuing the access request is already registered in the service management information 32 (Step S42: Y), it is judged whether a service requested by the mobile user terminal 20 is similar to a service registered in accordance with the user terminal ID 33 in the service management information 32 or not (Step S43).

When it is judged that the service requested by the mobile user terminal is not similar to the service registered in accordance with the user terminal ID 33 in the service management information 32 (Step S43: N), the content service information shown in FIG. 3 is referred and the service ID 34 registered in the service management information 32 in accordance with the mobile user terminal 20 is updated to a service ID 34 corresponding to a requested service (Step S44).

When the service ID 34 in the service management information 32 is updated in Step S44 or when it is judged that the service requested by the mobile user terminal 20 is similar to the service registered in the service management information 32 in Step S43 (Step S43: N), a service request message is transmitted to the content server 24 which is a requested destination via the Internet 22 (Step S45). The service request message includes the GWID 31 previously given to the GW unit $23_1$, $23_2$ and the service management information 32 updated in Step S44 and including the user terminal ID 33 for identifying the mobile user terminal 20 issuing the access request and the service ID 34 for identifying the service.

Then, the GW unit $23_1$, $23_2$ monitors reception of content data corresponding to a content service provided from the content server 24 which is the requested destination (Step S46: N). When the content data is received (Step S46: Y), the content data is transmitted to the mobile user terminal 20 issuing the access request (Step S47) and a series of processes is finished (End).

On the other hand, when the user terminal ID 33 of the mobile user terminal 20 issuing the access request is not yet registered in the service management information 32 (Step S42: N), an inquiry message including the GWID 31 previously given to the GW unit $23_1$, $23_2$ and the user terminal ID 33 for identifying the mobile user terminal 20 issuing the access request is transmitted to another GW unit 23₁, 23₂ previously set as an inquiry destination (Step S48). Then, when a response corresponding to the inquiry message transmitted in Step S48 is received from another GW unit 23₁, 23₂ in a predetermined time-out period (Step S49: Y), roaming information is received from a responding GW unit 23₁, 23₂ (Step S50). The roaming information includes the GWID 31 of the responding GW unit 23₁, 23₂, the user terminal ID 33 and the service ID 34 together with work information which is temporarily stored and which is necessary to provide the content service via the responding GW unit 23₁, 23₂. The GW unit 23₁, 23₁ receiving the roaming information registers the user terminal ID 33 and the service ID 34 included in the roaming information as the service management information 32 of the GW unit 23₁, 23₂ (Step S51).

Then, the service request message which is registered in Step S51 and which is the service management information 32 including the user terminal 33 ID for identifying the mobile user terminal 20 issuing the access request and the service ID 34 for identifying the requested service is transmitted to the content server 24 which is a requested destination via the Internet 22 together with the GWID 31 of the GW unit 23₁, 23₂ (Step S45).

Then, the GW unit 23₁, 23₂ monitors reception of content data corresponding to a content service provided from the content server 24 which is the requested destination (Step S46: N). When the content data is received (Step S46: Y), the content data is transmitted to the mobile user terminal 20 issuing the access request (Step S47) and a series of processes is finished (End).

Also, when no response corresponding to the inquiry message transmitted in Step S48 is received from another GW unit 23₁, 23₂ in a predetermined time-out period (Step S49: N), it is judged that no user terminal ID 33 of the mobile user terminal 20 issuing the access request is registered in another GW unit 23₁, 23₂, which is previously set as an inquiry destination, and a user terminal ID 33 of the mobile user terminal 20 issuing the access request and a service ID 34 corresponding to the requested service are newly registered in the service management information 32 so as to be corresponded (Step S52).

Then, the service request message which is registered in Step S52 and which is the service management information 32 including the user terminal ID 33 for identifying the mobile user terminal 20 issuing the access request and the service ID 34 for identifying the requested service is transmitted to the content server 24 which is a requested destination via the Internet 22 together with the GWID 31 of the GW unit 23₁, 23₂ (Step S45).

Then, the GW unit 23₁, 23₂ monitors reception of content data corresponding to a content service provided from the content server 24 which is the requested destination (Step S46: N). When the content data is received (Step S46: Y), the content data is transmitted to the mobile user terminal 20 issuing the access request (Step S47) and a series of processes is finished (End).

Figure 5:
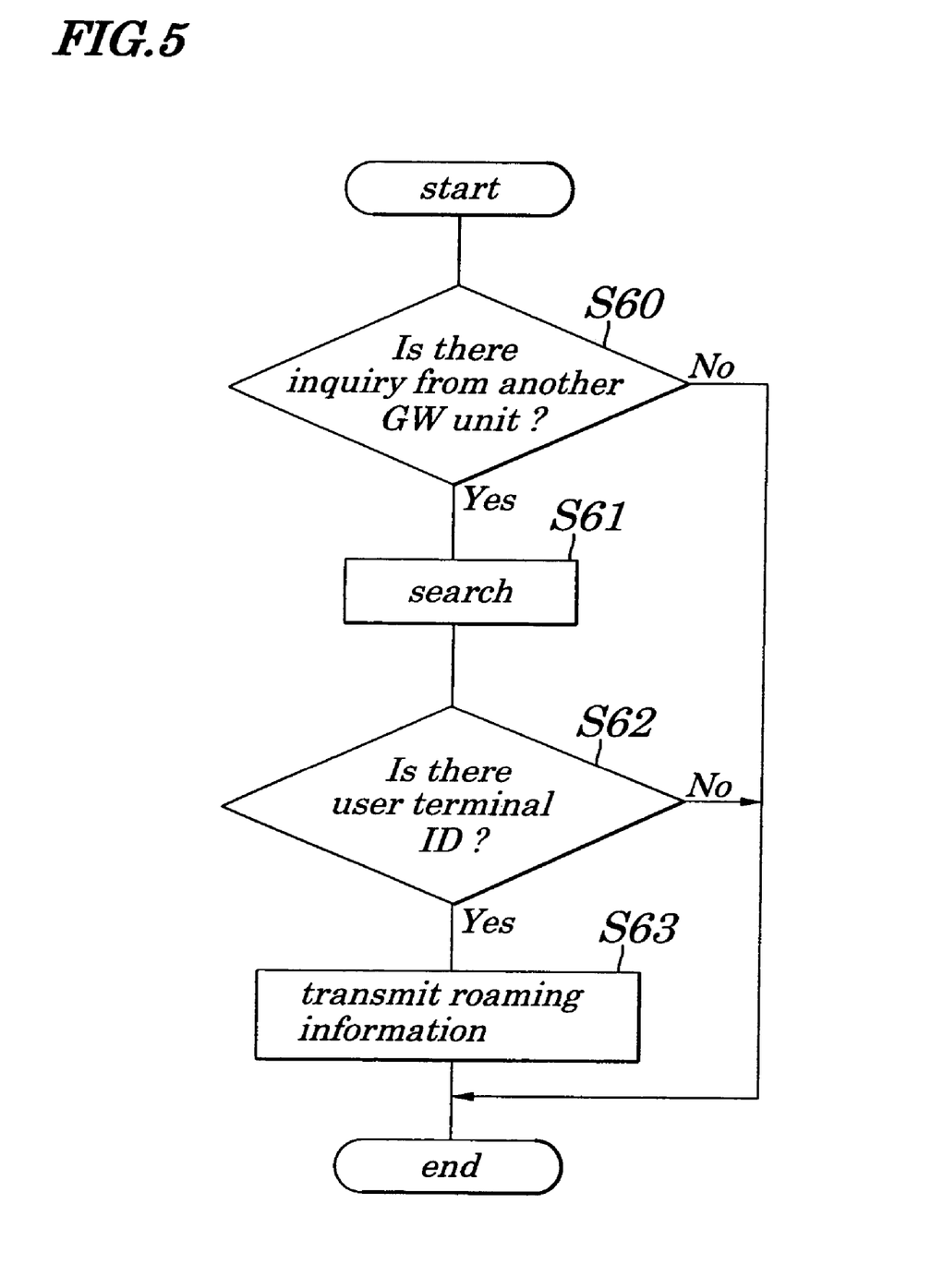
FIG. 5 is a flowchart showing processes of the gateway unit when there is an inquiry from another gateway unit.

FIG. 5 is a flowchart showing processes of the GW unit 23₁, 23₂ when there is an inquiry from a GW unit 23₁, 23₂ issuing an access request. In other words, when there is an inquiry whether a user terminal ID 33 receiving an access request from another GW unit 23₁, 23₂ is registered in the service management information 32 of the GW unit 23₁, 23₂ (Step S60: Y), the service management information 32 of the GW unit 23₁, 23₂ is searched using the user terminal ID 33 (Step S61). When the user terminal ID 33 as the search key is registered in the service management information 32 (Step S62: Y), the GWID 31 of the GW unit 23₁, 23₂ and the roaming information including the user terminal ID 33 and the service ID 34 are transmitted to the GW unit 23₁, 23₂ issuing the inquiry together with the working information temporally stored while the content server 24 provides the content service in the GW unit 23₁, 23₂ (Step S63) and a series of processes is finished (End).

Also, when there is no inquiry from another GW unit 23₁, 23₂ in Step 60 (Step S60: N), or when no user terminal ID 33 as the search key is stored in the service management information 32 in Step S62 (Step S62: N), there is no response and a series of processes is finished (End).

Next, an operation of the mobile communication system will be concretely explained with reference to FIG. 6. Here, explanations will be given of a case in that the mobile user terminal 20 in the first area issues an access request to the content server 24 accepted in the Internet 22 via the radio communication base station 25$_{N-3}$ and the first GW unit 23₁ and the mobile user terminal 20 moves (movement 26) to the second area in a communication connection state in which the content service is received from the content server 24.

Figure 6:
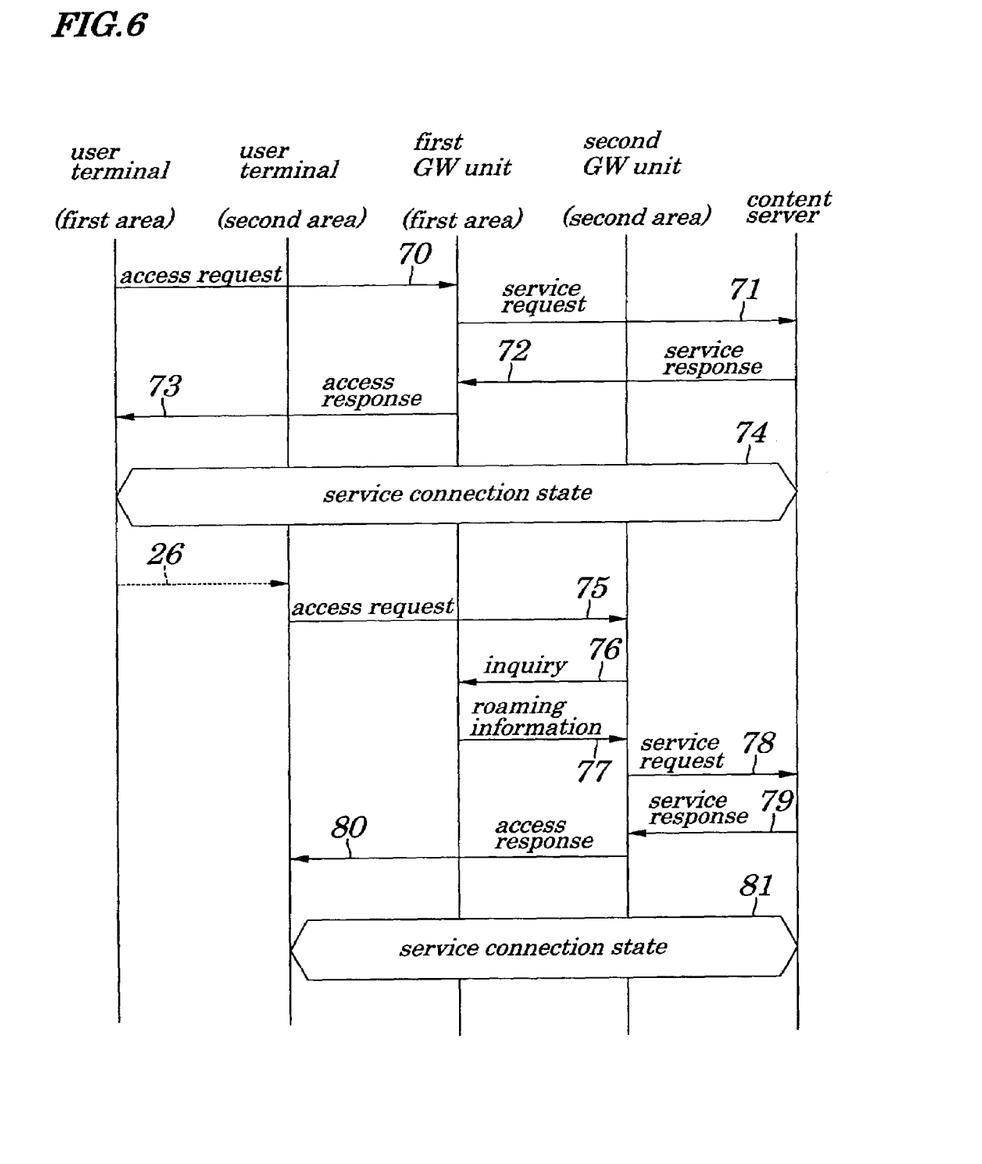
FIG. 6 is a sequential view showing an example of an operation of the mobile communication system according to the embodiment of the present invention.

FIG. 6 shows an example of the operation of the mobile communication system. An access request message 70 to the content server 24 transmitted by the mobile user terminal 20 in the first area so as to receive the content service is transmitted to the mobile communication network 21. In the mobile communication network 21, the access request message 70 is transmitted to the first GW unit 23₁ via the radio communication base station 25$_{N-1}$ which is predetermined so that the access request message 70 is transferred to the first GW unit 23₁ among the plurality of radio communication base stations 25₁ to 25$_N$ when there is an access request to the Internet 22.

The first GW unit 23₁ searches the service management information 32 using the user terminal ID 33 of the mobile user terminal 20 such as the telephone number shown in FIG. 4 as a search key. When it is assumed that the user terminal ID 33 is registered in the service management information 32, a service request message 71 including the user terminal ID 33 capable of identifying the mobile user terminal 20 and the service ID 34 capable of identifying a requested service is transmitted to the content server 24 providing the requested service together with the user terminal ID 33 capable of identifying the mobile user terminal 20.

The content server 24 picks up content data corresponding to the requested service identified by the service ID 34 and transmitted content data to the first GW unit 23₁ as a service response 72.

When the first GW unit 23₁ receives the content data corresponding to the requested service as the service response 72, the first GW unit 23₁ transmits the content data to the mobile user terminal 20 issuing the access request message 70 via the mobile communication network 21 as an access response 73. With this operation, the mobile user terminal 20 becomes a service connection state 74 to a service provided by the content server 24.

In the service connection state 74, when the mobile user terminal 20 in the first area moves to the second area by the movement 26, the roaming service is executed among the radio communication base station 25₁ to radio communication base station 25$_N$ in the mobile communication network 21. With this operation, the mobile user terminal 20 continues the communication connection state. As described above, a part of the radio communication base stations 25₁ to 25$_N$ which execute the roaming service transmit the access request message 70 to the content server 24 accepted in the Internet 22 to a predetermined GW unit $23_1$, $23_2$. With the movement 26, the mobile user terminal 20 is connected to the second GW $23_2$, for example, via the radio communication base station $25_N$, and an access request message 75 from the mobile user terminal 20 is transmitted to the second GW unit $23_2$ in the second area.

The second GW unit $23_2$, as shown in FIG. 4, searches the service management information 32 using the user terminal ID 33 of the mobile user terminal 20 such as the telephone number as the search key. Here, the user terminal ID 33 is not registered in the service management information 32, and therefore, an inquiry message 76 including the GWID 31 given to the second GW unit $23_2$ and the user terminal ID 33 capable of identifying the mobile user terminal 20 is transmitted to the first GW unit $23_1$ set as an inquiry destination.

The first GW unit $23_1$ receiving the inquiry message 76 searches the service management information 32 using the user terminal ID 33 of the user terminal ID 33 included in the inquiry message from the second GW unit $23_2$ as the search key. In the first GW unit $23_1$, the service management information 32 of the mobile user terminal 20 is already registered, roaming information 77 including the GWID 31 of the first GW unit $23_1$, the user terminal Id 33 and the service ID 34 is transmitted to the second GW unit $23_2$ together with working information temporally stored in the first GW unit $23_1$ so that the content server 24 accepted in the Internet 22 provides content services.

When the second GW unit $23_2$ receives the roaming information from the first GW unit $23_1$, the user terminal ID 33 of the mobile user terminal 20 and the service ID 34 included in the roaming information 77 are registered in the service management information 32 of the second GW unit $23_2$. Then, a service request 78 which is the service management information 32 including the user terminal ID 33 capable of identifying the mobile user terminal 20 and the service ID 34 capable of identifying the requested service is transmitted to the content server 24 providing the requested service together with the GWID 31 capable of identifying the second GW unit $23_2$.

The content server 24 picks up content data corresponding to the requested service identified by the service ID 34 and transmits the content data to the second GW unit $23_2$ as a service response 79.

When the second GW unit $23_2$ receives the content data corresponding to the requested service as the service response 79, the second GW unit $23_2$ transfers the content data to the mobile user terminal 20 issuing the access request via the mobile communication network 21 as an access response 80. With this operation, the mobile user terminal 20 becomes in a service connection state 81 to service provided by the content server 24.

As described above, the mobile communication system according to the embodiment, the mobile user terminal 20 connected to the mobile communication network 21 having a wide mobile communication service area receives content services from the content server 24 accepted in the Internet 22 via GW units $23_1$, $23_2$ located in predetermined areas. Among the plurality of radio communication base station $25_1$ to radio communication base station $25_N$ of the mobile communication network 21, concerning a part of radio communication base stations $25_1$ to $25_N$, the access request to the content server 24 accepted in the Internet 22 is transmitted to a predetermined GW unit $23_1$, $23_2$. When the mobile user terminal 20 moves from the first area to the second area by the movement 26, the roaming service is executed among radio communication base stations $25_1$ to $25_N$ in the mobile communication network 21, a part of radio communication base stations $25_1$ to $25_N$ is connected to the predetermined second GW unit $23_2$ and access request message 70 to the content server 24 is transmitted. When the second GW unit $23_2$ recognizes that an access request is transmitted from a mobile user terminal 20 not managed by the second GW unit $23_2$, the second GW unit $23_2$ inquires another GW unit $23_1$, $23_2$ and executes roaming service among GW units $23_1$, $23_2$ which respond, and thereby content service is continuously provided to the moving mobile user terminal 20. With this operation, though the mobile user terminal 20 moves between two places at a long distance, roaming service is executed among GW units $23_1$, $23_2$ located respective areas. Therefore, it is possible to receive the content services continuously and it is possible to improve system efficiency and provide stable services. Further, the roaming service is executed for a geographically nearest GW unit $23_1$, $23_2$ to the mobile user terminal 20, therefore, though the mobile user terminal 20 moves between two places at a very long distance, it is possible to receive services efficiently concerning a service quality and billing.

It is thus apparent that the present invention is not limited to the above embodiments but may be changed and modified without departing from the scope and spirit of the invention.

In the mobile communication system of the embodiment, the GW unit holds the service management information and content services are continuously provided to a moving mobile user terminal, however, the present invention is not limited to the embodiment.

For example, a mobile communication system may continuously provide content services to a moving mobile user terminal.

This mobile communication system is approximately similar to the mobile communication system shown in FIG. 1, however, the first GW unit and the second GW unit use respective content servers and no roaming service is executed.

That is, each content server holds each service providing management information including a user terminal ID and a service ID capable of identifying a service for each mobile user terminal providing content services.

When there is an access request from the mobile user terminal to the content server via the mobile communication network, the access request is transmitted to the content server as an access request message including the GWID capable of identifying each GW unit and the user terminal ID of each GW unit. The content server refers to the service providing management information, picks up content data of the service ID memorized so as to be corresponded to the user terminal ID, and transmits the content data to the GW unit identified by the GWID included in the received access request message. The GW unit transfers the content data received from the content server as a response of the access request message transmitted from the GW unit to the mobile user terminal issuing the access request.

As described above, in this mobile communication system, each terminal providing content services with the content server holds the service providing management information including the user terminal ID and the service ID capable of identifying a service, and content data is transmitted to the GW unit identified by the GWID included in the access request message. With this operation, it is unnecessary to provide communication lines for receiving and transmitting the roaming information among GW units, and therefore, it is possible to reduce infrastructure cost.

Further, the user management information includes the user terminal ID and the service ID, however, the present invention is not limited to this. For example, the service management information may include GWID, a user terminal ID and a service ID.

What is claimed is:

1. A mobile communication system comprising:
a content server for providing content data requested via a network;
a mobile communication terminal for issuing a request to provide said content data via a mobile communication network; and
a plurality of gateway units located respectively in predetermined areas, for executing protocol conversion of said request and said content data transmitted between said network and said mobile communication network and for continuously providing said content data from said content server to said mobile communication terminal by transmitting and receiving communication information to provide said content data, each gateway unit including an inquiry section, for inquiring of each of the other gateway units whether identification information of said mobile communication terminal is registered in a service management information storing section.

2. The mobile communication system according to claim 1, wherein said mobile communication network includes a plurality of radio communication base stations, each of said radio communication base stations which cover an area smaller than each of said predetermined areas and communicate one another, and at least one of said plurality of radio communication base stations transmits said request to a predetermined gateway unit among said plurality of gateway units.

3. The mobile communication system according to claim 2, wherein said request is transmitted to a gateway unit geographically nearest to said mobile communication terminal.

4. A mobile communication system comprising:
a mobile communication terminal for issuing a request to provide content data via a mobile communication network;
a plurality of gateway units, each of said gateway units located respectively in predetermined areas and including a protocol conversion section for executing protocol conversion of said request and said content data transmitted between a predetermined network and said mobile communication network, a request relay section for relaying said request and a terminal providing section for providing said content data to said mobile communication terminal in accordance with said request relayed by said request relay section; and
a content server for providing said content data to a gateway unit which has issued said request relayed by said request relay section via said predetermined network, wherein at least one gateway unit has an inquiry section for inquiring of each of the other gateway units whether identification information of said mobile communication terminal is registered in a service management information storing section.

5. The mobile communication system according to claim 4, wherein said mobile communication network includes a plurality of radio communication base stations, each of said radio communication base stations which cover an area smaller than each of said predetermined areas and communicate one another, and at least one of said plurality of radio communication base stations transmits said request to a predetermined gateway unit among said plurality of gateway units.

6. The mobile communication system according to claim 5, wherein said request is transmitted to a gateway unit geographically nearest to said mobile communication terminal.

* * * * *